G. A. SCHETTLER.
MACHINE FOR MEASURING THE SUPERFICIAL AREA OF LEATHER AND LIKE MATERIALS.
APPLICATION FILED FEB. 10, 1911.

1,114,917.

Patented Oct. 27, 1914.

4 SHEETS—SHEET 4.

UNITED STATES PATENT OFFICE.

GUSTAV ADOLF SCHETTLER, OF LEICESTER, ENGLAND.

MACHINE FOR MEASURING THE SUPERFICIAL AREA OF LEATHER AND LIKE MATERIALS.

1,114,917. Specification of Letters Patent. Patented Oct. 27, 1914.

Application filed February 10, 1911. Serial No. 607,744.

*To all whom it may concern:*

Be it known that I, GUSTAV ADOLF SCHETTLER, a subject of the Emperor of Germany, residing at Kandahar, Narborough Road, Leicester, England, have invented new and useful Improvements in or Relating to Machines for Measuring the Superficial Area of Leather and like Materials, of which the following is a specification.

This invention relates to machines for measuring the superficial area of material such for example as leather, cloth, paper and the like.

The invention refers to machines such for example as the "Sawyer" type and its object is to provide such machines with mechanism whereby, in addition to the indication of the superficial area as at present, the thickness or average thickness of the material may be measured and indicated.

A further feature consists in the provision of means by which the indicated measurement, both of the area and average thickness of the material, may be stamped upon the latter.

I am aware that area-measuring machines are already known wherein mechanism has been provided to stamp the material with the indicated area measurement and I do not make any claim to this broad feature *per se*.

The mechanisms comprising this invention will be hereinafter described in detail and reference will be made to the accompanying drawings, wherein:—

Figure 1:
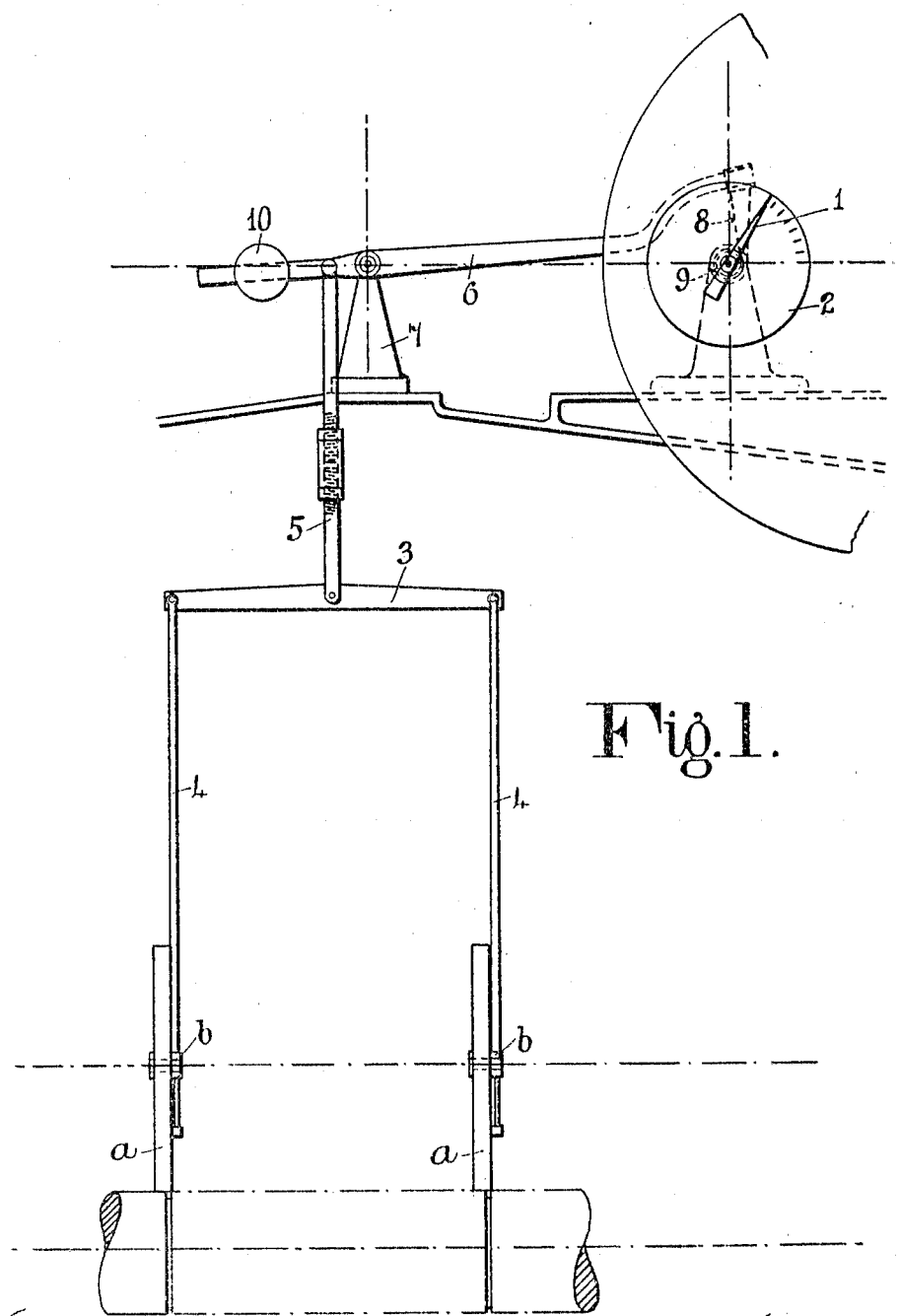
Figure 2:
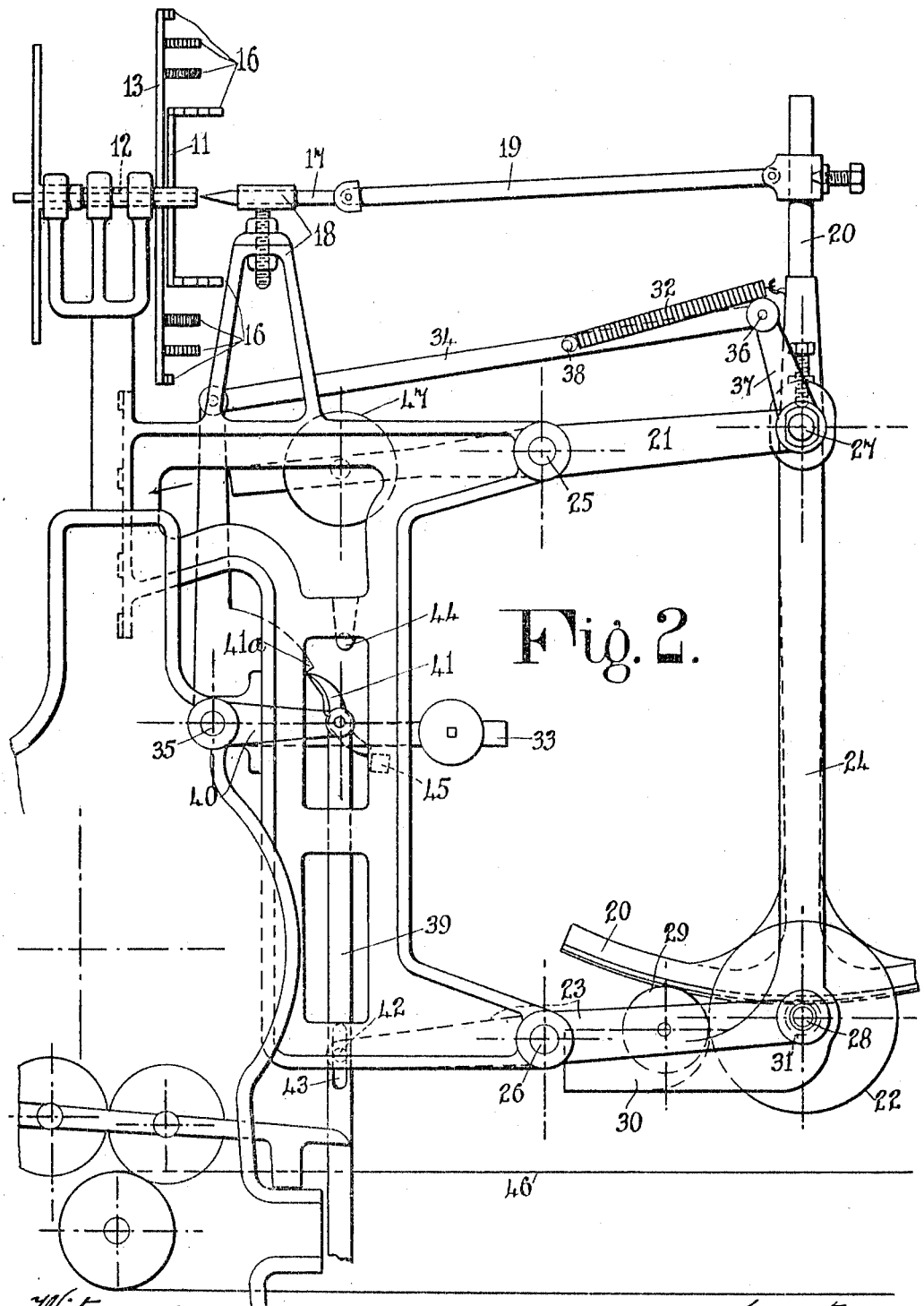
Figure 3:
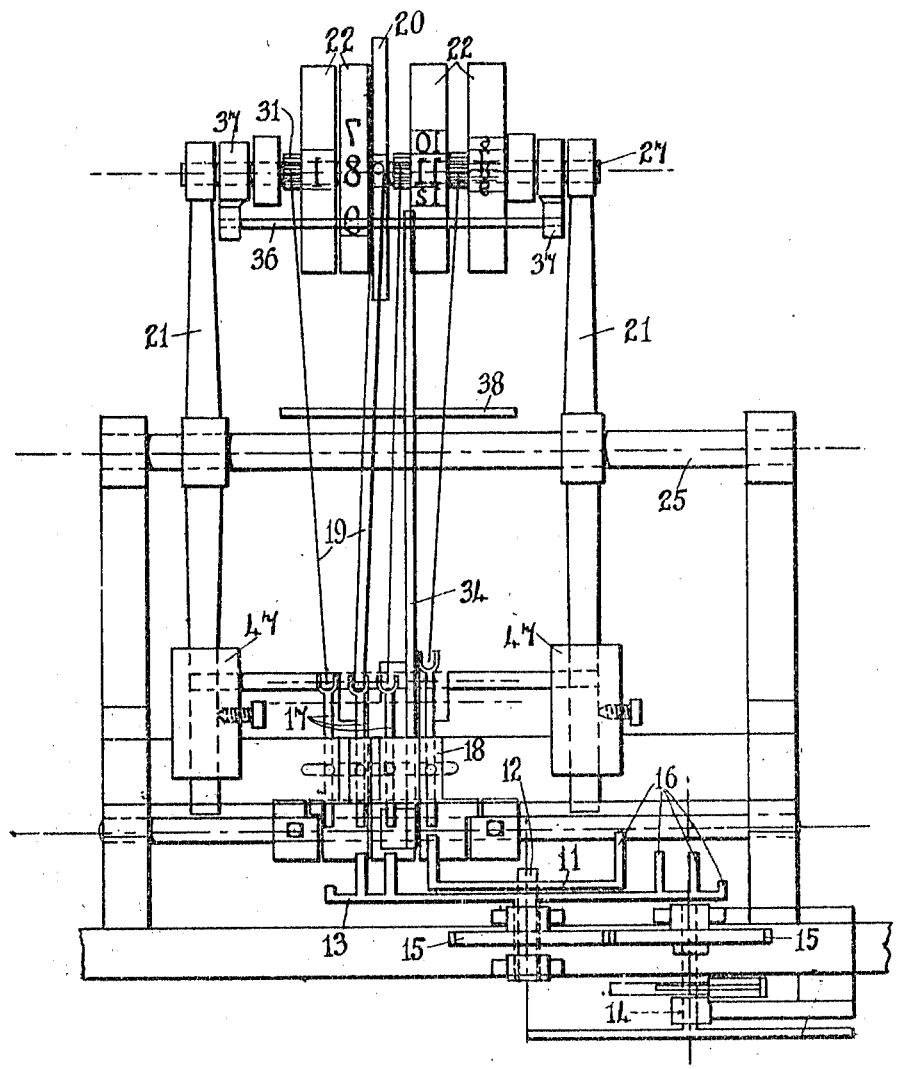
Figure 4:
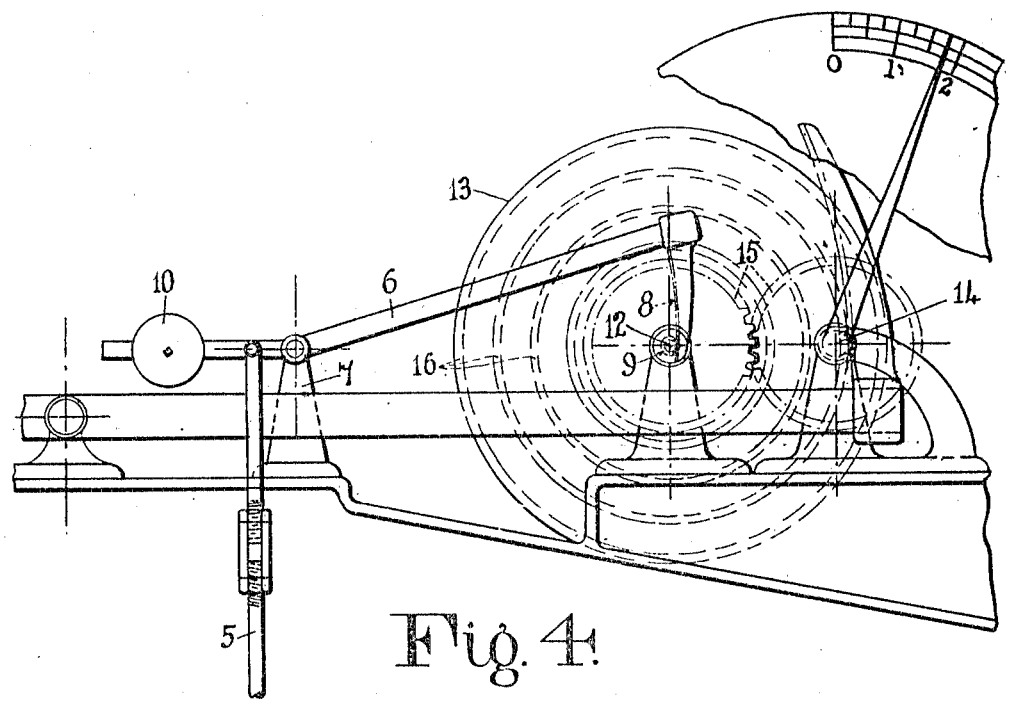
Figure 5:
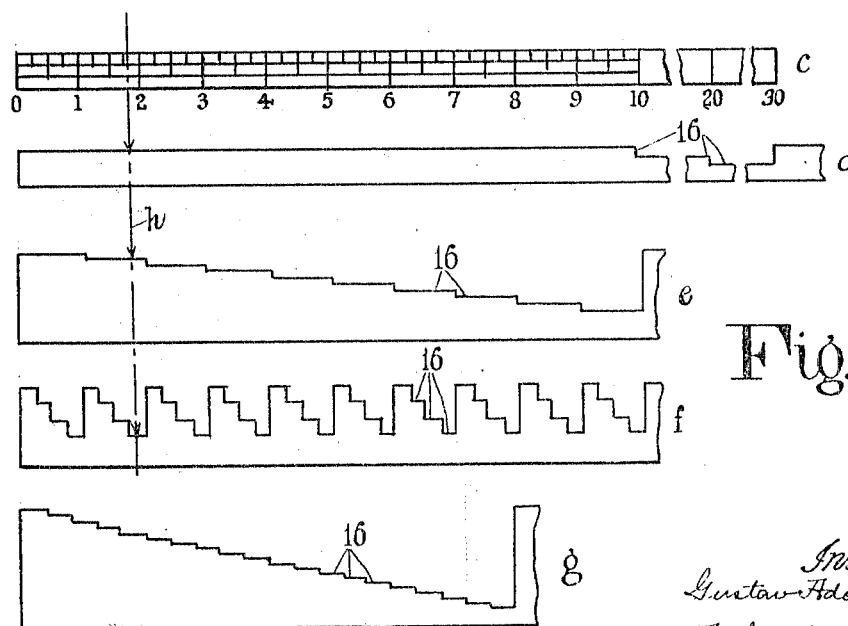

Figure 1 shows the mechanism for measuring and indicating the thickness of the material. Fig. 2 is a side elevation of the mechanism for stamping or marking the indicated measurements upon the material. Fig. 3 is a plan of the stamping or marking mechanism. Fig. 4 is a front view of the indicator dial and the actuating mechanism in connection with the same. Fig. 5 shows the stepped-edges of the indicator disks in an unrolled or straight form. Figs. 4 and 5 are drawn to a larger scale than the remaining figures and like parts are designated by the same reference characters throughout the drawings.

I will first describe the mechanism according to this invention for measuring and indicating the thickness or average thickness of the material as it is passed through the machine.

In order to obtain the average thickness throughout the width of the material, one or more of the usual measuring wheels $a$ on either side of the center are connected by intermediate mechanism with a pointer 1 movable around a dial 2, or with other suitable indicating mechanism so that when said wheels $a$ are raised by the material passing thereunder said indicating means will be actuated to show the amount of such lift of the wheels this representing the thickness of the material. The thickness measurement is preferably taken from two of the measuring wheels but it will be understood that one, or more than two may be utilized for this purpose if desirable. The two wheels which occupy that position on each side of the center which corresponds to the part of material where the thickness of the latter is approximately of the average, are chosen to actuate the thickness indicator, and the intermediate mechanism for transmitting the amount of lifting movement of the said measuring wheels may be of any suitable character. One form of this intermediate mechanism may consist of a centrally pivoted horizontal lever or beam 3 (Fig. 1), the length of which embraces the two measuring wheels $a$ from which the actuation is to be taken. The ends of this pivoted beam 3 are connected by rods 4 one to each supporting arm or lever $b$ of the measuring wheels in such a manner that when either or both wheels rise the beam 3 will also rise in company therewith. The pivoted beam 3 is supported by an adjustable coupling rod 5 from a lever 6 (Figs. 1 and 4) suitably pivoted on a fixed bracket 7 and adapted when moved, by the movement of the beam 3, to rotate the pointer 1 of the indicator which shows the thickness of material passing through the machine. The indicator lever 6 may rotate the pointer 1 by means of a rack 8 which gears with a pinion 9 on the spindle of the pointer, or by other equivalent means, and said lever 6 may be returned to its normal position as herein shown by a counterweight 10.

When more than two measuring wheels $a$ are employed to measure the thickness of the material these would communicate the amount of their lift or rising movement to an integrating system of levers (not shown) but such as is used in the well-known Sawyer machines which levers in turn would move the indicator lever 6 in a similar manner to that already employed on machines for actuating the area indicator thereof. When only the thickness of material of a uniform thickness is required, and not, as before described the average thickness of material possessing a varying thickness, then one wheel *a* may be connected direct with the lever 6 actuating the indicator or any number of wheels may be connected to one common lever or rocking bar 3 after the manner employed in the Sawyer machine.

I will now describe the means according to this invention for stamping the material with the indicated area and thickness. These means comprise a series of type wheels which may be movable by hand or foot lever into and out of contact with the material and with which, intermediate mechanism is combined to set or rotate said type wheels to bring the figures or marks, corresponding to the measurement indicated, into the proper position for stamping. An important feature is that the stamping mechanism is not brought into contact with the indicating mechanism until it is required for use, *i. e.*, not until after the material has been measured, so that during the time measurement of the material is taking place the indicating mechanism is quite free and unrestricted, thus its delicate adjustment and operation is not in any way interfered with. At the rear of the area and thickness indicator dials, and adapted to be rotated by the spindles of the pointers of said dials are disks, cams or equivalents. These disks or cams are each furnished on their face with a series of steps or projections, or with a helical projection or cam edge. By preference a series of steps are made use of and the disks are arranged in the following manner and as shown in Figs. 3 and 4. The disk 11 which is to be rotated in company with the pointer 1 which indicates the thickness of the material is mounted rigidly upon the spindle 12 of said pointer so as to rotate therewith. The other disk 13 which is to be actuated by the pointer which indicates the area measurement is rotatably mounted on the same spindle 12 as the disk 11 but is rotated from the spindle 14 of said area pointer by means of gear wheels 15, one of which is mounted upon the spindle 14 and the other upon the sleeve or boss of the disk 13.

The steps 16 (Figs. 2, 3 and 5) on the disks 11 and 13 are of different heights from the face of the said disks and represent the different figures or indications on the corresponding dials. For example the scale *c*, Fig. 5, may represent the scale of square feet (or other measure) on the area indicating dial and the rows *d, e, f* of stepped edges 16 underneath said scale may respectively represent tens, units and quarters in correspondence with the scale *c* on the dial. The stepped edge in row *g* may represent the thickness in any suitable measure such as fractional parts. As the pointers rotate, the series of steps 16 on the disks move past the end of plungers or slide rods 17 (Figs. 2 and 3) suitably supported in a bracket 18 or other fixed part of the machine frame. Each slide rod 17 is pivotally connected by means of a link or connecting rod 19 to one end of a toothed quadrant or segment 20 pivotally mounted so as to swing at the end of rocking levers 21.

Rotated by the toothed quadrants or segments 20 are type wheels 22 carried at the end of rocking arms or brackets 23, which are coupled to the before mentioned rock levers 21 by links 24 and arranged to move in company with the said rock levers. These rock levers and arms are preferably two in number and are fulcrumed on spindles 25 and 26 respectively, the pivoted quadrants 20 and type wheels 22 being mounted on rods 27 and 28, respectively carried by the ends of the levers and arms. The levers and arms are arranged to be actuated as will be described so as to bring the surface of the type wheels 22 into and out of contact with the surface of the material. Suitable inking rollers or wheels 29 may be provided and rotated in a bath 30 of ink or paint and in contact with the type wheels. The inking rollers are rotated by friction with the type wheels 22 or they may be driven by suitable gearing actuated by the segments. A swinging segment 20 is furnished for each type wheel 22 and drives the latter by means of a pinion 31 thereon. The segments are turned or rocked on their pivots 27 by mechanism comprising springs 32 a pivoted and counterweighted rock lever 33 and a connecting link 34. The rock lever 33 is mounted upon a fulcrum 35 supported by the machine frame, and the connecting link 34 is attached to a rod 36 (Fig. 3) carried at either end by an arm 37 free to rock upon the fulcrum rod 27 of the segments 20. The springs 32 are connected respectively to the upper ends of the segments or quadrants 20 and to a rod 38 which extends on either side of the connecting link 34.

When in the normal position, the springs 32 are kept out of action *i. e.* the rock lever 33 under the influence of its counterweight rocks the arms 37 and the rod 36 makes contact with the upper ends of the segments 20 and moves them into line so that all the type wheels 22 become set at zero. The rock lever 33 is positively moved in the direction indicated by the arrow by means of a link 39 joined at its lower end in a manner well understood to a foot treadle (not shown), so that, when the treadle is depressed, the lever 33 will be moved upwardly to withdraw the rod 36 from contact with the segments 20, and place the springs 32 under tension between the said quadrants and rod 38. The quadrants, under the influence of their springs 32, swing on their pivot rod 27 and rotate the type wheels 22 until the movement of each quadrant is arrested by the contacting of the sliding plungers 17 with the steps 16 on the corresponding disks. These disks having been previously turned or rotated with the advance of the pointers to indicate the thickness and area measurements, arrest the movement of the segments 20 when their type wheels are turned or set to the number which corresponds to the measurement indicated by the pointers. For instance, suppose the area indicated is one and three quarters as represented in Fig. 4, then the plungers or slide rods 17 would make contact with their respective stepped edges at the point indicated by the line $h$ in Fig. 5, so that the tens type wheel will remain at zero, the units wheel will be moved to mark one unit, and the fractional or quarter wheel will mark three quarters. The link 39 is pivoted at its upper end to a short lever 40, loosely mounted on the fulcrum 35 of the rock lever 33. This lever 40 carries at its end a pawl or detent 41, arranged to engage a notch or tooth $41^a$ on the rock lever 33, when the lever 40 is raised by the link 39. The rocking arms 23 are connected to the link 39 by means of a pin 42 and slot 43 the latter being of sufficient length to allow the link 39 a certain amount of free movement before it moves the rocking arms 23 to lower the type wheels 22 into contact with the material to stamp the same. This free movement is required to enable the link to actuate the rock lever 33 to release the quadrants, before the type wheels are lowered into contact with the material being measured and it may, as hereinafter described perform other functions. After the type wheels 22 have been set and subsequently lowered to stamp the material with the measurement indicated, the rear end of the pawl or detent 41 makes contact with a fixed pin 44, and said pawl is thereby disengaged from the notch or tooth $41^a$, and the rock lever 33 being thus freed, is moved by its counterweight back to the normal position and the quadrants return the type wheels to zero, as soon as said wheels are lifted from the material. A suitable stop 45 limits the return movement of the rock lever 33. During the stamping or marking of the material the latter is supported upon a bed or table which receives it after it has passed through the measuring mechanism of the machine. This bed or table may be of any well known construction and arrangement such for example as a traveling endless band 46 whose travel may be controlled by the foot lever which actuates the link 39, so that, before the latter releases the swinging segments 20, the traveling bed 46 will be stopped in any suitable manner to bring the material to rest in the desired position under the type wheels 22. The rocking levers 21 and arms 23 which support the segments 20 and type wheels 22 may be counterbalanced by weights 47 on the levers 21, and the pin and slot connection between the arms 23 and the link 39 as before described, allows the link to be moved a given distance before lowering the stamping wheels into contact with the material. The connecting means 19 intermediate of the sliding plungers 17 and the swinging segments 20 are adjustable in a suitable manner (for example up and down the segments) so that the rotation of the type wheels 22 may be set correctly relatively to the different steps 16 on the disks 11 and 13.

What I claim is:—

1. In a machine of the class described, in combination, a device rotatable by the surface measured, a marking mechanism provided with a plurality of characters indicative of surface areas, means coöperating with said marking mechanism and with said movable device to present to the surface measured by the machine a character of the marking mechanism corresponding to the area measured by the machine, a second rotatable device concentric with the first-mentioned rotatable device and responsive to the difference in thickness of the surface being measured independently of the first-mentioned device, a marking mechanism provided with a plurality of characters indicative of thickness, means coöperating with said thickness marking mechanism and with the device responsive to the thickness of the material to present to the surface measured by the machine a character of the thickness marking mechanism corresponding to the thickness of the material.

2. In a machine of the class described, in combination, a marking mechanism to mark the surface being measured, a rotatable cam disk having a plurality of steps of different length, means movable toward and from said cam disk and coöperating therewith and with said marking mechanism to position the marking mechanism according to the position of the cam disk, and means to rotate said cam disk, substantially as described.

3. In an area-measuring machine, a series of type or marking wheels movable into and out of contact with the material being measured, means to automatically set said type wheels to the correct marking position, manually operated means to put said setting into operation, and a plurality of cam disks movable in company with the measurement indicating means to arrest the action of the aforesaid setting means when the type wheels have been moved to the position which corresponds to the indication of the indicating means substantially as and for the purpose described.

4. In an area-measuring machine stamping or marking indicating devices provided with pointers, mechanism consisting of disks rotated by the pointers of the indicating devices, a series of graduated steps on said disks, a series of rotatable type wheels, an inking roller for the type wheels, a series of swinging segments to actuate the type wheels, rock levers to carry said type wheels, arms to carry said segments, means to move said rock levers and arms to bring the type wheels into and out of contact with the material, a series of plungers connected to and actuated by the swinging segments said plungers being adapted to make contact with the steps on the rotary disks, and means for actuating the segments consisting of a rocking rod adapted to move said segments to the normal position, springs to move said segments to cause a rotation of the type wheels when the rod is released, a rock lever to actuate said rocking rod and bring it into and out of contact with the segments, and means to actuate said rock lever substantially as and for the purpose described.

5. In a machine of the class described, in combination, a marking mechanism to mark the surface being measured, a movable device having a plurality of steps of different length, means actuated by the surface being marked for moving said device, and means movable toward and from said stepped device and coöperating therewith and with said marking mechanism to arrest the marking mechanism according to the position of the stepped device, substantially as described.

6. In a machine of the class described, in combination, a plurality of independently operable marking mechanisms indicative of the area of the surface being measured, a plurality of devices coöperating with said marking mechanisms to operate them independently of each other, and a common actuating means for said devices movable by the surface being measured, substantially as described.

7. In a machine of the class described, in combination, a marking mechanism indicative of area, a second marking mechanism indicative of thickness, means for operating said marking mechanisms independently of each other to position characters thereof corresponding to the area of the surface being measured and of the thickness of the material, and means for simultaneously actuating said marking mechanisms to mark the said material on its surface, substantially as described.

In testimony whereof I have signed my name to this specification in the presence of two subscribing witnesses.

GUSTAV ADOLF SCHETTLER.

Witnesses:
WM. W. C. TAYLOR,
GEORGE LESTER.